United States Patent [19]
Martin

[11] Patent Number: 5,852,555
[45] Date of Patent: Dec. 22, 1998

[54] DUAL INVERTER POWER SUPPLY

[76] Inventor: Ricky Martin, 1851 Pitcairn Dr., Costa Mesa, Calif. 92626

[21] Appl. No.: 991,981

[22] Filed: Dec. 17, 1997

[51] Int. Cl.$^6$ .......................... H02M 7/00; H02M 3/335
[52] U.S. Cl. ................................ 363/71; 363/25; 363/98
[58] Field of Search .................................. 363/24, 25, 26, 363/71, 78, 79, 80, 95, 97, 98, 131, 132, 133, 134; 307/82, 83

[56] References Cited

U.S. PATENT DOCUMENTS

| | | | |
|---|---|---|---|
| 3,706,022 | 12/1972 | Corey et al. | 363/24 |
| 4,061,957 | 12/1977 | Jan Vader | 363/22 |
| 4,222,098 | 9/1980 | Nagano | 363/71 |
| 5,008,795 | 4/1991 | Parsley et al. | 363/20 |
| 5,255,174 | 10/1993 | Murugan | 363/17 |
| 5,459,650 | 10/1995 | Noro | 363/24 |
| 5,508,903 | 4/1996 | Alexndrov | 363/16 |
| 5,567,997 | 10/1996 | Suzuki et al. | 307/127 |
| 5,729,444 | 3/1998 | Perol | 363/25 |
| 5,771,163 | 6/1998 | Moriguchi et al. | 363/71 |

*Primary Examiner*—Adolf Berhane
*Attorney, Agent, or Firm*—Curtis L. Harrington

[57] ABSTRACT

An improved circuit and device uses a dual primary winding transformer, where the primary windings are connected in series, and where each winding has a center tapped ground. A series of four switches are attached to the ends of the two primary windings to sequentially feed the primary windings. The switches are controlled by a pair of oscillators, the first two switches on one primary winding controlled by a first oscillator, and the second two switches of the other primary winding controlled by a second oscillator. Both the first and second oscillator are controlled by a phase displacement controller which can vary the relative timing of the two oscillators to control the transformer output. A zero phase angle delivers maximum power, while a 180° phase displacement delivers zero power, enabling precise control across the zero to full power spectrum. A series of feedback controls measure the current and voltage of the output of a rectifier bridge to even more closely control the power output. A dual inverter utilizes a single transformer for light weight, efficient operation.

14 Claims, 4 Drawing Sheets

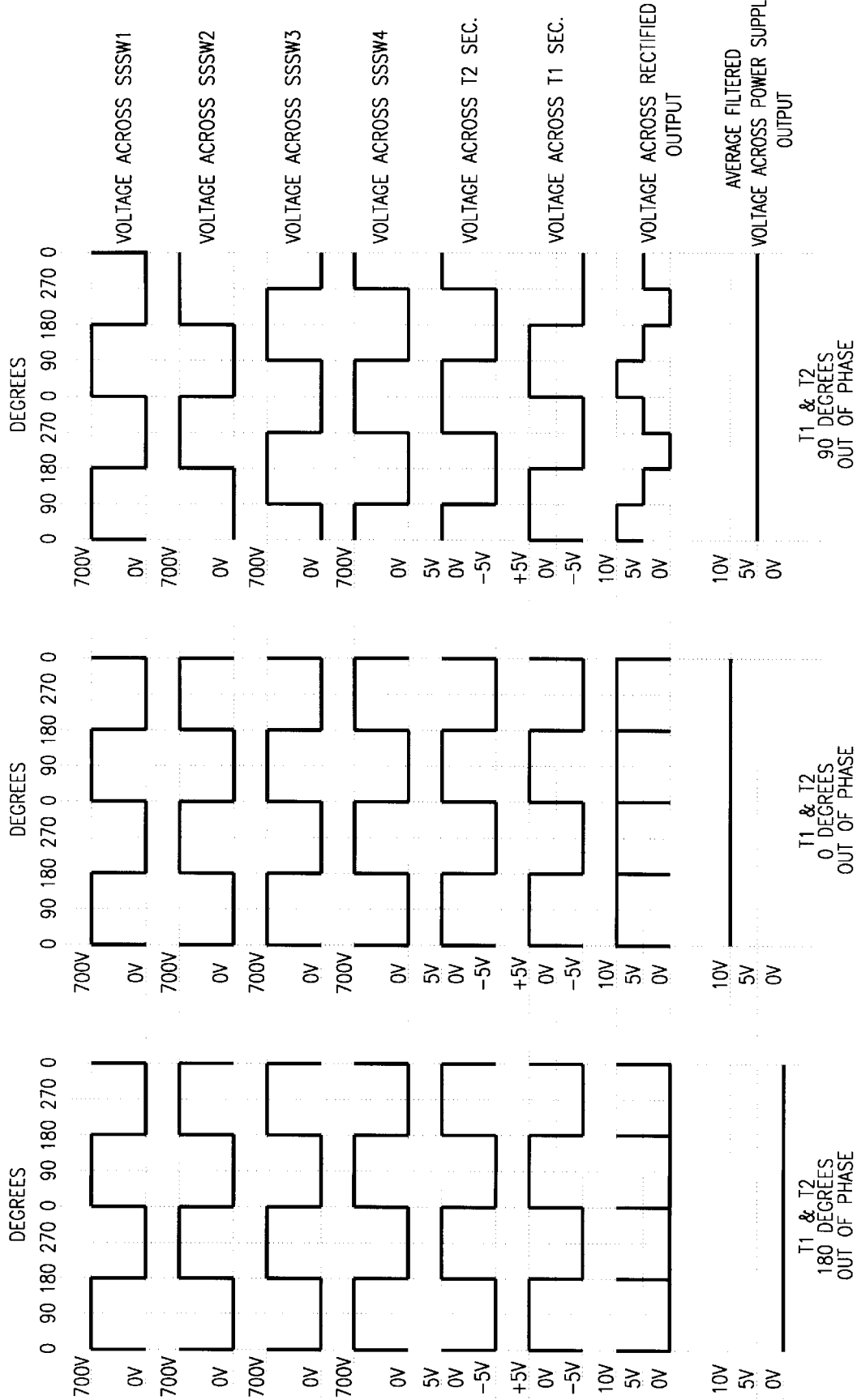

DUAL INVERTER POWER SUPPLY

FIELD OF THE INVENTION

This invention relates to a circuit and device for creating a low voltage and high current electrical power source which may be used for fusing and/or welding two or more metallic surfaces which come into contact against each other. The invention particularly relates to a circuit which eliminates low efficiency associated with the presence of both switching and saturation losses, and allows for a smaller, lighter transformer advantageous in the automated welding field.

BACKGROUND OF THE INVENTION

In a conventional "H" configuration alternating current power source, a direct current source is applied to a pair of parallel legs, each of which has a pair of series connected switches. A first inductor of a transformer connects the two parallel legs at a point between each pair of series connected switches. The second inductor, the transformer secondary, supplies output power based upon the opening and closing of the switches in each of the series legs. As one switch in one of the series combination upstream of the first inductor feed is closed, the other switch in the series combination is opened, while in the other series combination, the switch upstream of the first inductor connection is open, and the switch downstream switch in the series combination is closed. Once the current is allowed to flow in this configuration, the states of the switches are changed as quickly as possible to cause current to flow.

The problems with this design includes the switching loss, combined with the saturation loss and the current density inefficiency. In order for the switches to operate properly, all of the switches as a practical matter must be open for a short moment before any two can be closed. This is due to (1) making sure that both switches in a parallel leg are not closed at the same time which would cause a short, and (2) to make sure that the silicon controlled rectifier (SCR) switches, if used, have an opportunity to reset. The second, more important source of inefficiency is saturation loss. The losses are proportional to the product of the saturation voltage and the saturation current. The use of a single primary winding limits the output of the transformer and requires control to be limited to the temporal domain.

The control is based upon duty cycle, or the percentage of on time to the total time. Control of the transformer output is based upon a further limitation of the on time, from the upper limit which was already limited to give the switches a chance to clear, etc. Good lower limit control cannot be achieved efficiently since the time for current to begin to flow is not instantaneous. Thus where the pulse is controlled to occupy ten percent of the total allowable time, a ten percent power output will not occur since a significant portion of the pulse time will be spent simply enabling the pulse to rise to an acceptable point. As such, precise control cannot be had based upon percentage of on time, especially at lower percentages of the duty cycle. As the frequency of operation increases, these types of losses become even more severe.

These inefficiencies become even more unwieldy when used in a device for high frequency welding where a significant magnitude output current is generated. Welding and fusing operations require a relatively low voltage and hi current electrical power source for the purpose of fusing or welding two or more metallic surfaces which may be forced against each other under pressure while electric current is passed through the contact junction. The electrical current applied creates heat, which changes the molecular structure of the metallic surfaces in contact with each other and forms a metallic bond with sufficient structural holding strength at the point of contact. Precise control of heat volume and heat time at predetermined speed is required to achieve precise fusing of metals with equal and repetitive weld strength.

In the field of robotic welding, the current source needs to be as close as possible to the welding area for greatest efficiency and to reduce additional heat load from current flowing through cables, especially since the current is so high. The output transformer may be mounted on the robotic arm. To achieve sufficient current with the limitations outlined above, the transformer would have to be unduly large. Carrying a large, heavy transformer or current generator on the robotic arm which moves around the work piece consumes even more energy and requires a robotic arm of increased strength and which is slower, thus causing lower productivity on the line.

Good power transfer should be enabled in all three of high frequency, intermediate frequency and low frequency ranges. Transformers which have the size for significant power output cannot operate at high frequencies with any utilizable efficiency. The natural impedance of a large transformer would not enable it to complete its cycle at high frequency. Most high frequency welding is currently done at a relatively low frequency to enable delivery of sufficient power. It would be helpful to raise the potential operating frequencies to as high as possible to enable welding with greater control of the hot spots and more efficient application of energy to the weld point. This should be possible with an output of from about 1000 amps to about 100,000 amps under ideal conditions.

What is therefore needed is a circuit and device which enables high current at high frequency to be generated. The needed method should include conversion of the standard AC power source available in most industrial facilities, to a high-speed controllable voltage and current electrical power source. The power source may be programmed to produce a modulated heat by means of modulating the electrical current volume. Even more importantly, the needed circuit and device should provide itself with the capability for monitoring, and feedback to provide precise voltage, or current, or power to the fusing or welding electrodes.

SUMMARY OF THE INVENTION

An improved circuit and device uses a dual primary winding transformer having a pair of primary windings, and where each winding has a center tapped ground. A series of four switches are attached to the ends of the two primary windings to sequentially feed the primary windings. The switches are controlled by a pair of oscillators, the first two switches connected to the ends of a first primary winding controlled by a first oscillator, and the second two switches connected to the ends of a second primary winding controlled by a second oscillator. The secondary winding is divided into a pair of series connected windings with the first winding associated with the first primary and having a first core, and the second of the secondary windings associated with the second primary winding and having a second core; in essence using two separate transformers whose secondaries are series linked. Both the first and second oscillator are controlled by a phase displacement controller which can vary the relative timing of the two oscillators to control the transformer output. A zero relative displacement phase angle delivers maximum power, while a 180° relative displacement phase angle delivers zero power, given the orientation of the circuitry shown. The use of phase control enables precise control across the zero to full power spectrum. A series of feedback controls measure the current and voltage of the output of a rectifier bridge to even more closely control the power output.

BRIEF DESCRIPTION OF THE DRAWINGS

The invention, its configuration, construction, and operation will be best further described in the following detailed description, taken in conjunction with the accompanying drawings in which:

FIG. 3 illustrates graphically the states of the switches and outputs of the circuit of FIG. 1 at a phase displacement of 180°, 0° & 90°;

FIG. 4 illustrates graphically the states of the switches and outputs of the circuit of FIG. 1 at a phase difference of 0°;

FIG. 5 illustrates graphically the states of the switches and outputs of the circuit of FIG. 1 at a phase difference of 90°.

DETAILED DESCRIPTION OF THE PREFERRED EMBODIMENT

Figure 1:
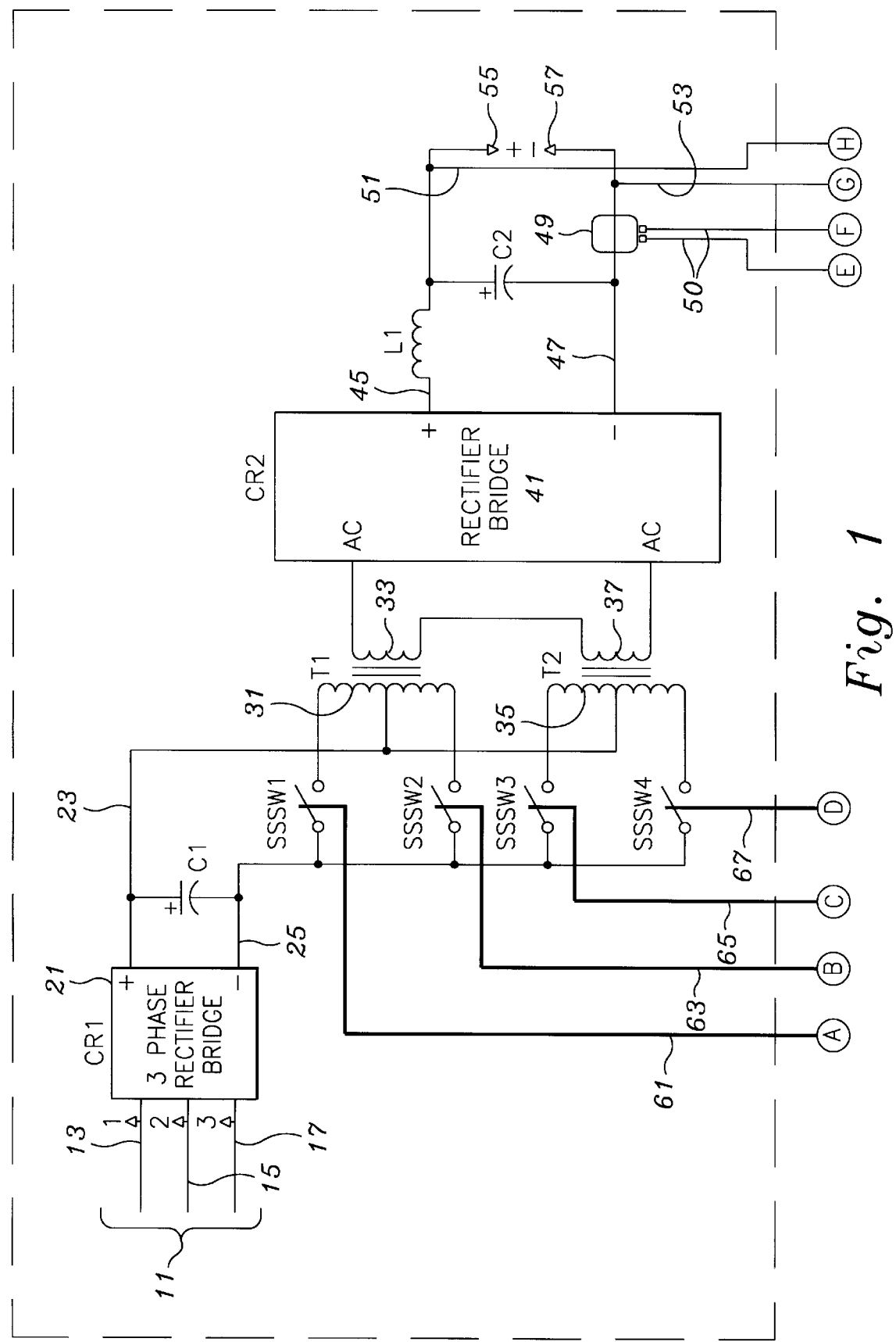
FIG. 1 is an overall schematic of the voltage and current bearing components of the circuit of the invention.

The description and operation of the invention will be best initiated with reference to FIG. 1. At the upper left side of FIG. 1, a three phase source 11 supplies electricity through three lines 13, 15, & 17 to a three phase rectifier bridge 21. The three phase rectifier bridge 21 has a pair of direct current outputs, including a first line 23 and a second line 25. A filtering capacitor C1 is connected between first direct current line 23 and second direct current line 25 to short any alternating current components still present, and provide a low impedance to an instantaneous current demand.

A pair of transformers are shown and labeled T1 and T2. The T1 transformer has a center tapped primary coil 31 and a secondary coil 33. The center tap of the primary coil 31 is connected to the first direct current line 23. The ends of the primary coil 31 are connected to a pair of switches, one end of coil 31 is connected to one terminal of a first switch SSSW1, the other end of switch SSSW1 connected to the second direct current line 25. The other end of coil 31 is connected to one terminal of a first switch SSSW2, the other end of switch SSSW2 is connected to the second direct current line 25.

Transformer T2 transformer has a center tapped primary coil 35 and a secondary coil 37. The center tap of the primary coil 35 is connected to the first direct current line 23. The ends of the primary coil 35 are connected to a pair of switches, one end of coil 35 is connected to one terminal of a first switch SSSW3, the other end of switch SSSW3 connected to the second direct current line 25. The other end of coil 35 is connected to one terminal of a first switch SSSW4, the other end of switch SSSW4 is connected to the second direct current line 25.

The transformer T1 secondary coil 33 has a first end connected into a rectifier bridge 41 and a second end. The transformer T2 secondary coil 35 has a first end connected into the second end of secondary coil 33 of transformer T1, and a second end connected into the rectifier bridge 41.

The output of the rectifier bridge 41 includes a first low voltage high current line 45 and a second low voltage high current line 47. Lines 45 and 47 have a filter in the form of a series connected inductor L1 in the line 45 and a capacitor C2 connected between the lines 45 and 47. Downstream of the filter capacitor C2 is a current loop 49 surrounding the line 47 for measuring the current in line 47. Current loop 49 has a pair of leads 50 extending away from the current loop 49. A pair of voltage test leads 51 and 53 are seen, with test lead 51 connected to line 45 and test lead 53 connected to line 47. The ends of lines 45 and 47 are triangularly shaped to symbolize their application to an article to be welded or fused, and are seen as welding or fusing electrodes 55 and 57.

Each of the switches SSSW1, SSSW2, SSSW3, & SSSW4 have an actuation line, namely a line 61, 63, 65, and 67 respectively. The actuation lines 61, 63, 65, and 67 control the opening and closure of the switches SSSW1, SSSW2, SSSW3, & SSSW4.

Figure 2:
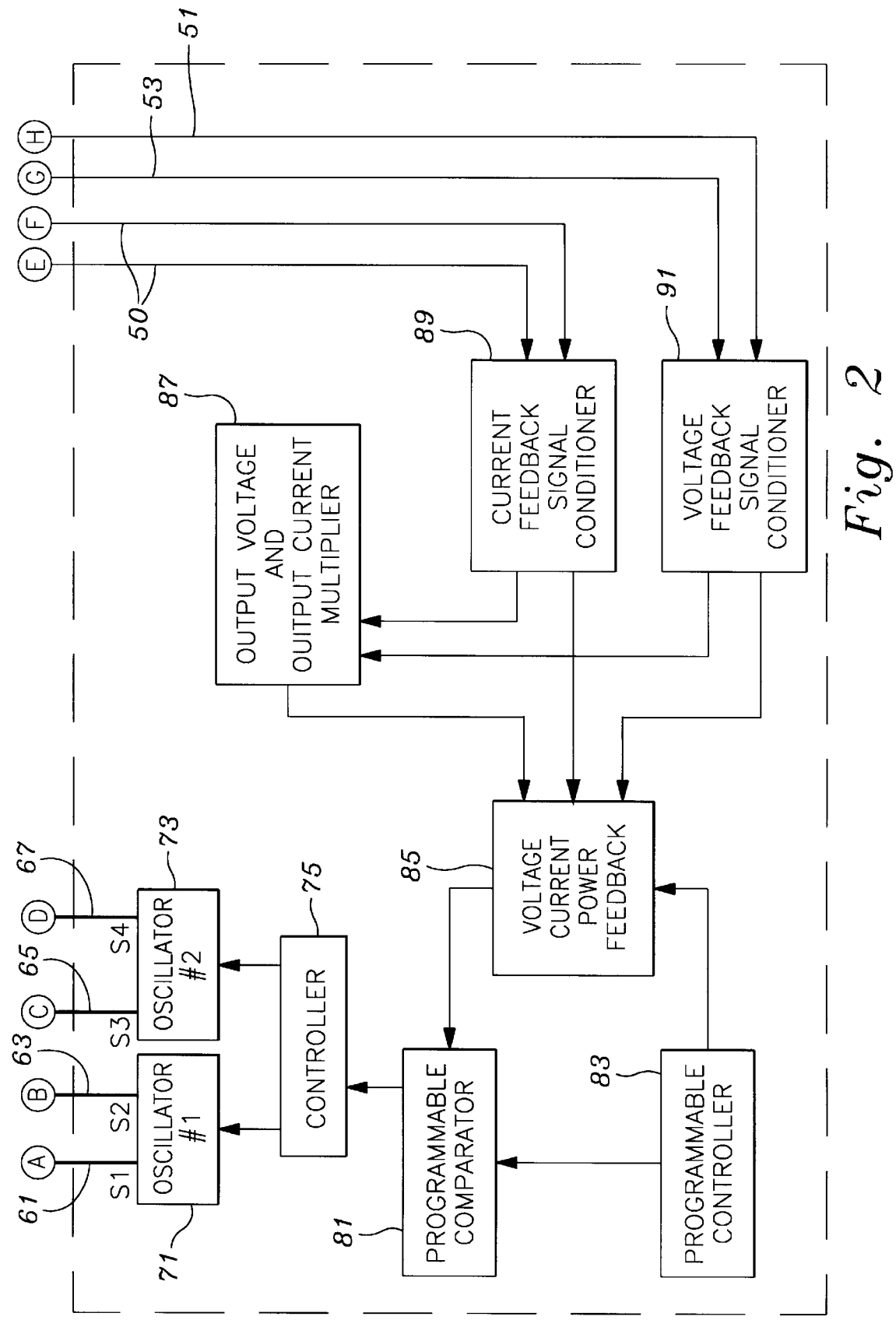
FIG. 2 illustrates the control layout of the circuit and which is keyed to FIG. 1.

Referring to FIG. 2, it can be seen that the lines 61 & 63 are connected to an oscillator 71, while lines 65 & 67 are connected to an oscillator 73. Both of the oscillators 71 and 73 are connected to and independently controlled by a phase controller 75. Into the phase controller is the beginning of a control system which controls the operation of the oscillators 71 and 73, and their relative timing of operation, based upon the current and voltage levels requested, and by adjusting for current and voltage feedbacks from the current loop 49 and the pair of voltage test leads 51 and 53. It is understood that many other methods and configuration of control are possible, and that this is just one configuration.

In the control configuration shown, the phase controller 75 is directly connected to a programmed comparator 81. Programmed comparator 81 has a first input from a programmable controller 83 and a second input from a voltage current power feedback block 85. The programmable controller 83 is also connected back into the voltage current power feedback block 85.

The voltage current power feedback block 85 is connected into a voltage and current multiplier block 87, a current feedback signal conditioner 89, and a voltage feedback signal conditioner 91. The voltage and current multiplier block 87 receives inputs from both the current feedback signal conditioner 89, and the voltage feedback signal conditioner 91. The current feedback signal conditioner 89 is connected to the leads 50 of the current loop 49. The voltage feedback signal conditioner 91 is connected to the voltage test leads 51 & 53.

Referring to FIGS. 3, 4, & 5, a series of three diagrams illustrating a 180°, 0° and 90° phase displacement relationship are shown together in order to utilize a common row label, which is shown to the right of FIG. 5.

Referring to FIG. 3, a diagram illustrating a 180° phase displacement relationship for the oscillators 71 and 73 which corresponds to voltages across the switches SSSW1, SSSW2, SSSW3, and SSSW4, the secondary windings 37 and 33, and the voltage across the output of the rectifier bridge 41 as seen across capacitor C2, is shown.

The OSCILLATOR 71 (labeled #1) and OSCILLATOR 73 (labeled #2) are two symmetrical square wave generators operating at the same frequency. Their purpose is to turn 'on' and 'off' the 4 solid state switches SSSW1, SSSW2, SSSW3, and SSSW4, using the lines 61, 63, 65, & 67. The solid state switches SSSW1, SSSW2, SSSW3, and SSSW4 are turned on and off alternately at 50% duty cycle. When the odd number switches are on, the even number switches are off and vice versa. It should be noted on FIG. 1 that the winding polarity of transformer T1 is such that transformer magnetic flux flows in one direction when SSSW1 is on and SSSW2 is off, and in the other direction when SSSW2 is on and SSSW1 is off. The same is true for the windings of transformer T2, and its associated switches SSSW3 and SSSW4. The illustration of the voltage across the solid state switches can be seen in FIG. 3.

The vertical scale of FIG. 3 is a relative phase scale and is marked at 90° intervals beginning at 0°, with the 360° mark labeled as 0° again. As is seen, the vertical section time period is useful for illustrating time events, as well as relative angular phase displacement. The changes taking place across the phase progression occur at 180° time intervals, for example. During the first 180° period, the voltage across SSSW1 is high (open condition), SSSW2 is low (closed condition), SSSW3 is low (closed condition), SSSW4 is high (open condition). This urges the currents in the series connected secondary coils 33 and 37 in opposite directions. Here, current in the coil 31 is taken as producing a positive voltage (seen as the waveform labeled VOLTAGE ACROSS T1 SEC.), while current in the coil 35 is taken as producing a negative voltage (seen as the waveform labeled VOLTAGE ACROSS T1 SEC.). This results in a net zero flow of power both into and out of the bridge rectifier 41. This is also seen by visually comparing the current flow tendency across the secondary windings 37 and 33, and noting that they are opposite, and algebraically add to zero. The algebraic sum is seen in the waveform labeled VOLTAGE ACROSS RECTIFIED OUTPUT. The solid state switches transition spikes shown are filtered out if need be, and of no operational consequence. The bottom-most waveform is the AVERAGE FILTERED VOLTAGE ACROSS POWER SUPPLY OUTPUT and is shown to have a resultant voltage of 0 volts, and which appears at the capacitor C2.

Note that the voltage scale used for the voltages across the switches SSSW1, SSSW2, SSSW3, and SSSW4 is shown to be 700 volts, and that this magnitude can vary from case to case as the design dictates, 700 volts chosen for convenience of understanding. This results in a voltage output at C2 which is zero, due to the algebraic addition of the voltage seen across the T2 secondary at −5 volts, to the voltage seen across the T1 secondary at +5 volts, and is also shown by the 0 V line at the bottom diagrams. The same result occurs during the time which elapses between the 180° and 0° time periods.

Referring to FIG. 4, the second Figure in the series of three, the relationship of 0° phase difference is seen, and which will produce maximum power output. Referring to the first 180° of time, during the first set of states, the voltage across SSSW1 is high (open condition), SSSW2 is low (closed condition), SSSW3 is high (open condition), SSSW4 is low (closed condition). This urges the currents in the series connected secondary coils 33 and 37 in the same direction resulting in a double net flow of power both into the bridge rectifier 41. This is also seen by comparing the waveforms VOLTAGE ACROSS T2 SEC. with the VOLTAGE ACROSS T1 SEC and remembering that they algebraically add. Visually, it can be seen that the current produced across the secondary windings 37 and 33 is of the same polarity and double the voltage going into the rectifier bridge 41. With the algebraic sum of the two secondary windings T1 and T2 being added, the thus rectified and filtered output is at maximum attainable voltage. This results in a voltage output at C2 which is 10 volts, and is also shown by the 10 V line at the bottom diagrams.

The waveforms shown in FIG. 5 represents the 90° phase relationship, for half the maximum power output. Note that the first two wave forms representing SSSW1 and SSSW2 have a fixed relationship, as must be the case to avoid a short. The same is true for the states of SSSW3 and SSSW4. However note that the waveforms for SSSW3 and SSSW4 are shifted half way to the one side with respect to SSSW1 and SSSW2. This causes them to be in phase for half of the time that they assume a fixed state and out of phase for the other half of the time in which they are in their fixed state. This produces an instantaneous 10 volts output for one quarter of the time, an instantaneous 0 volt output for one quarter of the time, and an instantaneous 5 volt output half of the time. The average for these voltage magnitudes over time is 5 volts. The averaging displayed in FIG. 3 is the filtered output with a high resistive load. The used output voltage is the equivalent RMS average as it appears across the electrode shorting the metals to be welded or fused. This averages to 5 volts, and indeed the averaging may physically occur through C2 if it is large enough, or if the time periods are short enough. It is understood that FIGS. 3, 4, & 5 show the extreme relationships, and that phase relationships producing an amount of voltage from 0% to 100% is contemplated, based upon the circuit shown.

Figure 6:
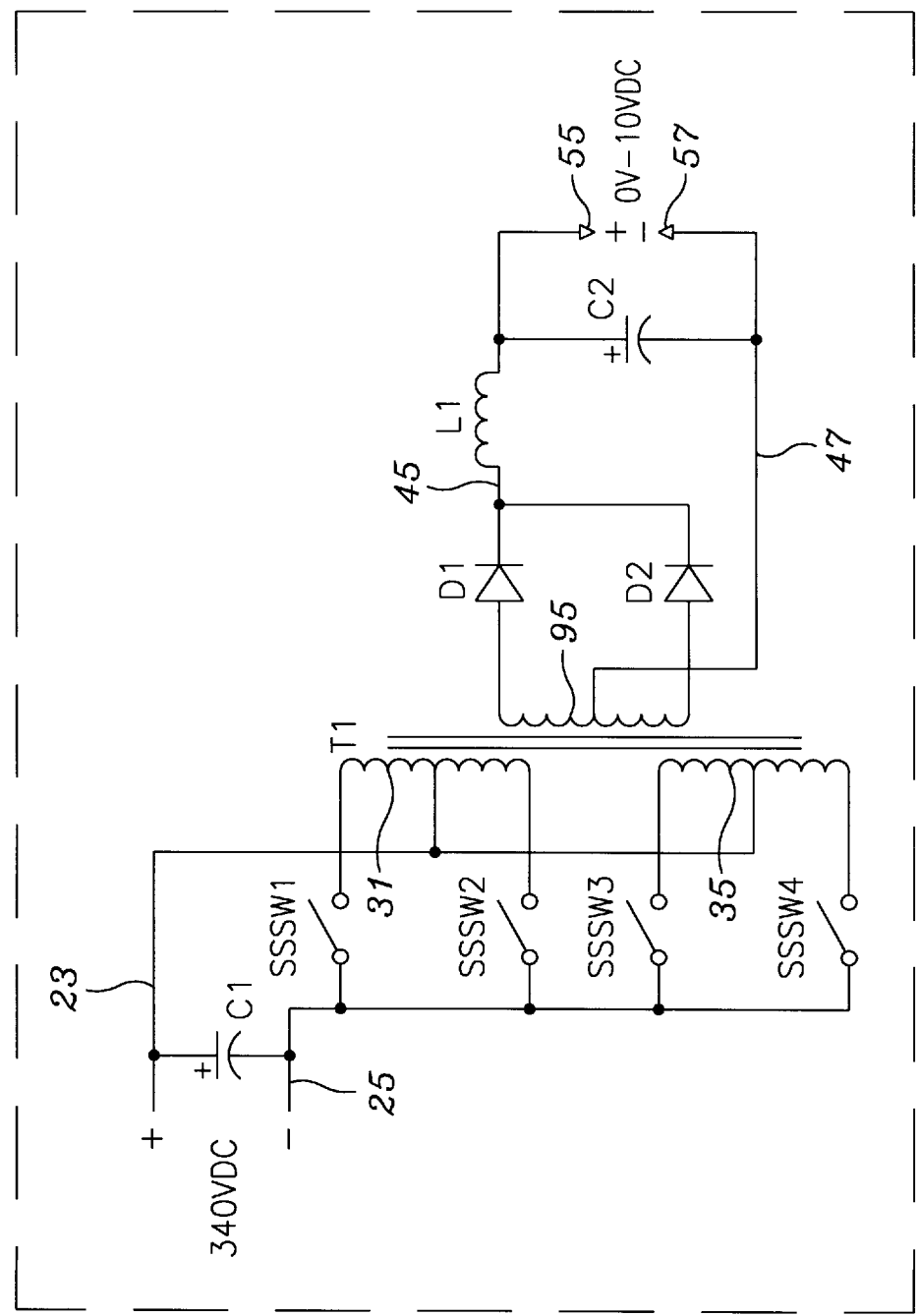
FIG. 6 is an overall schematic illustrating a variation of the voltage and current components of the circuit of FIG. 1 where a single transformer is utilized.

Referring to FIG. 6, a variation on some of the circuitry seen in FIG. 1 is shown, and where the circuit components are the same and perform the same function as the circuitry of FIG. 1, they are labeled the same. The FIG. 6 circuit combines two inverters into a single transformer. The circuit begins downstream of the three phase rectifier bridge 21 which is not shown, where the lines 23 and 25 receive a high voltage direct current source, such as about 340 volts D.C. The switches SSSW1, SSSW2, SSSW3, & SSSW4 are not shown as connected to their controlling oscillators 71 & 75, only for simplicity, and the operation of the circuit will be the same as for FIG. 1 and will require such connection.

Here, a single transformer T3 is provided which contains the center tapped primary windings 31 and 35, as were shown in FIG. 1, but magnetically linked through a single core. The phase of the two inverters in the primary coils 31 and 35 are controlled as was described for FIGS. 3–5, with the two primary coils 31 and 35 of a pair of input inverters having the ability to phase sum in order to achieve control. The windings 31 and 35, however, in a single transformer T3 will be wound on opposite sides of the same transformer core. Transformer T3 has a single center tapped secondary winding 95. One end of winding 95 is connected to the current input end of a diode D1, while the other end of winding 95 is connected to the current input end of a diode D2. The current output ends of the diodes D1 and D2 are connected together and become the first low voltage high current line 45 seen in FIG. 1. The single center tapped secondary winding 95 becomes the second low voltage high current line 47 seen in FIG. 1. Lines 45 and 47 continue exactly as seen in FIG. 1 with the filter in the form of a series connected inductor L1 in the line 45 and a capacitor C2 connected between the lines 45 and 47. The circuit of FIG. 4 provides more efficient rectification due to the reduction of current and resistance (IR) losses and transformer core losses.

While the present invention has been described in terms of a circuit to be used in welding and the like, one skilled in the art will realize that the structure and techniques of the present invention can be applied to many similar devices. The present invention may be applied in any situation where a phase control or power averaging is to be used electrically to achieve desired electrical or electronic output.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A dual inverter power supply comprising:
   a first and a second switch, connected such that when said first switch is on, said second switch is off and when said first switch is off said second switch is on, each having a first end connected to one of a first and a second high voltage direct current source and each having a second end;
   a first primary coil having a first end connected to said second end of said first switch and having a second end connected to said second end of said second switch, and having a center tapped connection with the other of said first and said second high voltage direct current source;
   a third and a fourth switch, connected such that when said third switch is on, said fourth switch is off and when said third switch is off said fourth switch is on, each having a second end connected to one of said first and said second high voltage direct current source, and each having a second end;
   a second primary coil having a first end connected to said second end of said third switch and having a second end connected to said second end of said fourth switch, and having a center tapped connection with the other of said first and said second high voltage direct current source;
   a first secondary coil having a first end and a second end, magnetically linked with said first primary coil;
   a second secondary coil having a first end connected to said second end of said first secondary coil, and a second end, and magnetically linked with said second primary coil;
   a rectifier bridge having a first input connected to said first end of said first secondary coil and a second input connected to said second end of said second secondary coil, said rectifier bridge having a pair of electrical power outputs for at least one of welding and fusing, and;
   a phase controller to control the relative timing of operation of said first and second switches with respect to said third and fourth switches to control a magnitude of current and voltage of said electrical power outputs of said rectifier bridge.

2. The power supply as recited in claim 1, wherein said first primary and said first secondary coil is a first center tapped transformer and wherein said second primary and said second secondary coil is a second center tapped transformer.

3. The power supply as recited in claim 1, wherein said first primary coil and said second primary coil are constructed on a single transformer core and said first and said second secondary coil are series connected and also formed on said single transformer core.

4. The power supply as recited in claim 1, wherein said first, second, third, and fourth switches are solid state switches.

5. The power supply as recited in claim 1, and further comprising a feedback comparator associated with said pair of electrical power outputs for welding for measuring at least one electrical characteristic of said pair of electrical power outputs for at least one of welding and fusing, and having an output connected to said phase controller to provide feedback control of the relative timing of operation of said first and second switches to achieve better controlled operation of said power supply.

6. The power supply as recited in claim 1, and wherein said at least one electrical characteristic of said pair of electrical power outputs is output current.

7. The power supply as recited in claim 1, and wherein said at least one electrical characteristic of said pair of electrical power outputs is output voltage.

8. The power supply as recited in claim 1, and wherein said at least one electrical characteristic of said pair of electrical power outputs is output power.

9. The power supply as recited in claim 1, and further comprising a first electrode connected to one of said pair of electrical power outputs for at least one of welding and fusing, and a second electrode connected to the other of said pair of electrical power outputs for at least one of welding and fusing.

10. The power supply as recited in claim 1, and further comprising a programmable controller having an output connected to said phase controller to provide control of the relative timing of operation of said first and second switches.

11. The power supply as recited in claim 10, and further comprising a feedback comparator associated with said pair of electrical power outputs for at least one of welding and fusing for measuring at least electrical characteristic of said pair of electrical power outputs for welding and having an output connected to said phase controller to provide feedback control of the relative timing of operation of said first and second switches to achieve better controlled operation of said power supply.

12. A dual inverter power supply comprising:
    a first and a second switch, connected such that when said first switch is on, said second switch is off and when said first switch is off said second switch is on, each having a first end connected to one of a first and a second high voltage direct current source and each having a second end;
    a first primary coil having a first end connected to said second end of said first switch and having a second end connected to said second end of said second switch, and having a center tapped connection with the other of said first and said second high voltage direct current source;
    a third and a fourth switch, connected such that when said third switch is on, said fourth switch is off and when said third switch is off said fourth switch is on, each having a second end connected to one of said first and said second high voltage direct current source, and each having a second end;
    a second primary coil having a first end connected to said second end of said third switch and having a second end connected to said second end of said fourth switch, and having a center tapped connection with the other of said first and said second high voltage direct current source;
    a secondary coil having a first end and a second end and a center tap, and magnetically linked with said first primary coil;
    a first diode having a current input end connected to said first end of said secondary coil, and a current output end;
    a second diode having a current input end connected to said second end of said secondary coil and a current output end connected to the current output end of said first diode, the current output ends of said first and second diodes, and said center tap of said secondary coil forming a pair of electrical power outputs for welding, and;

a phase controller to control the relative timing of operation of said first and second switches with respect to said third and fourth switches to control a magnitude of current and voltage of said electrical power outputs for welding.

13. The power supply as recited in claim 12, wherein said first primary coil and said second primary coil and said secondary coil is constructed on a single transformer core.

14. A dual inverter power supply comprising:

a transformer having a first inverter primary coil having a first end and a second end and a second inverter primary coil having a first end and a second end;

a first and a second switch, connected such that when said first switch is on, said second switch is off and when said first switch is off said second switch is on, each having a first end connected to one of a first and a second high voltage direct current source and each having a second end, said first end of said first inverter primary coil connected to said second end of said first switch, said second end of said first inverter primary coil connected to said second end of said second switch, said first inverter primary coil and having a center tapped connection with the other of said first and said second high voltage direct current source;

a third and a fourth switch, connected such that when said third switch is on, said fourth switch is off and when said third switch is off said fourth switch is on, each having a second end connected to one of said first and said second high voltage direct current source, and each having a second end, said first end of said second inverter primary coil connected to said second end of said third switch, said second end of said second inverter primary coil connected to said second end of said fourth switch, said second inverter primary coil and having a center tapped connection with the other of said first and said second high voltage direct current source;

a second secondary coil having a first end connected to said second end of said first inverter secondary coil, and a second end, and magnetically linked with said second inverter primary coil;

a rectifier bridge having a first input connected to said first end of said first inverter secondary coil and a second input connected to said second end of said second inverter secondary coil, said rectifier bridge having a pair of electrical power outputs for at least one of welding and fusing, and;

a phase controller to control the relative timing of operation of said first and second switches with respect to said third and fourth switches to control a magnitude of current and voltage of said electrical power outputs of said rectifier bridge.

* * * * *